April 17, 1962 A. ANDREWS 3,030,435
SHIELDING PANEL WITH WIRE EMBEDMENT
Filed June 2, 1959

INVENTOR.
Arthur Andrews
BY
Ezekiel Wolf, Wolf & Greenfield

United States Patent Office 3,030,435
Patented Apr. 17, 1962

3,030,435
SHIELDING PANEL WITH WIRE EMBEDMENT
Arthur Andrews, Sanford, Maine, assignor, by mesne assignments, to American Cyanamid Company, New York, N.Y., a corporation of Maine
Filed June 2, 1959, Ser. No. 817,654
2 Claims. (Cl. 174—35)

The present invention relates to building panels having electrostatic shielding properties and to a method of making such panels.

In the present invention panels are formed with a wire mesh of conductive material embedded in a plastic synthetic resin body.

Each panel has connected to its mesh an externally projecting conductor, adapted to be electrically connected to conductors of adjacent panels to form a continuous circuit between adjacent panels. These panels are formed preferably of a translucent or transparent resin.

These panels may be used to form walls and ceilings of rooms for electrostatically isolating such rooms.

Thus it is an object of the present invention to provide a panel adapted for use in rooms where it is desired to electrically isolate the room from random radio frequency signals.

A further object of the present invention is to provide a reinforced panel adapted to pass light and also function as an electrostatic shield.

A further object of the present invention is to provide a rigid carrier and protective covering for a conductive mesh adapted for electrostatic shielding. This wire mesh will not corrode or become dirty as it is completely isolated from the air.

The present invention also provides a method of forming a panel having a wire mesh embedded in a body of resin material in such a manner as to avoid sinks, bubbles and problems of delamination.

Figure 1:
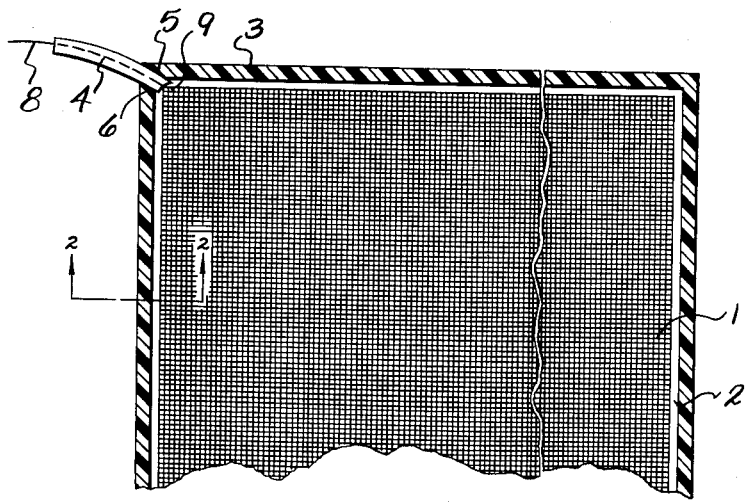
Figure 2:
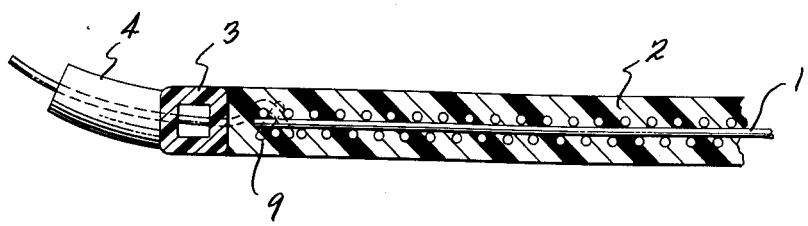

These and other objects and advantages of the present invention will be more clearly understood when considered in conjunction with the accompanying drawings in which:

FIG. 1 is a plan view; and
FIG. 2 is a cross sectional view taken along the line 2—2 of FIG. 1.

Referring to FIG. 1 there is ilustrated a wire mesh 1 formed of a conductive material such as and preferably aluminum. The diameter and mesh openings of the mesh within wide ranges are not critical and are determined by the purpose and overall dimensions of the panel itself. Where the panel is used as a shield for radio frequency waves a coarse mesh is suitable. Thus, for example, mesh openings ¼" square have been satisfactory. The wire of the mesh may vary in diameter. However, a diameter of .047" has been found satisfactory. This mesh 1 is embedded intermediate the outer surfaces of the rigid resin panel 2. This panel may be formed of a wide variety of synthetic resins. The resins may be monomers or comonomers capable of polymerizing into a relatively hard solid. Such monomer of comonomers may be of any of the well-known polymerizable compounds, such as, the esters, amides, nitriles and salts of acrylic or methacrylic acids, halo-acrylic or methacrylic acids, vinyl acetate, styrene, halo and alkyl substituted styrenes, vinyl chloride, vinyl acetate mixtures, allylic monomers, diallylphalate, diallyl carbonate, and the like vinyl compounds, all of which are relatively mobile liquids capable of polymerizing into a relatively hard mass. Other materials are well-known in the art. Reference is made to Modern Plastic Encyclopedia, 1955 edition, pages 101 and 176, respectively, for a more complete disclosure of suitable material. The materials specifically mentioned above are all capable of hardening into transparent or translucent masses. Such translucent or transparent masses are preferable where paneling is to be used in a ceiling adapted to pass some light.

A gasket 3 extends entirely about the mesh 1 and defines the edges of the panel. This gasket 3 is bonded to the resin material during the polymerizing process and may be removed when the edges of the panel are trimmed.

A tail or tubular gasket 4 projects between adjacent ends 5 and 6 of the gasket 3 with the ends 5 and 6 of the gasket 3 closely adjacent the sides of the gasket 4. An aluminum wire 8 projects longitudinally through the gasket 4 and is tied, soldered or otherwise suitably connected to the mesh 1, as illustrated at 9. The wire 8 may be made of aluminum similar to the mesh 1. However, it preferably is formed of a highly flexible aluminum alloy so as to withstand substantial flexing. This tail 4 projects outwardly of the panel and is adapted to be connected by suitable means to corresponding tails in adjacent panels or in any other suitable arrangement desired. The wire tail 8 should be substantially more flexible than the wire mesh 1 as it must withstand substantial flexing during handling. On the other hand the mesh 1, when once embedded in the resin 2, is maintained in a rigid position at all times.

The gaskets 3 and 4 protect the edges of the panel and wire 8 during handling. They may be removed on installation of the panel.

Gasket 3 is utilized during the manufacturing process. It spaces two facing sheets of glass at a uniform distance to form an enclosing mould during the polymerizing of the resin material.

A typical panel which may be formed in accordance with the present invention comprises a polymerized acrylic sheet of translucent material having embedded therein an aluminum wire mesh with ¼" square openings. The wire may be .047" in diameter and the sheets may be formed with an overall size of 2' x 4' x 3/16". Such an arrangement is quite suitable for ceiling panels wherein it is desirable to pass light but isolate radio frequency waves.

In forming such a panel an enclosing gasket 3 is arranged on a flat sheet of glass in a rectangular form with its ends spaced slightly apart. A wire mesh is then laid within the gasket. A wire tail 8 in a protective tail gasket 4 is positioned between the adjacent ends of the gasket 3. A second glass panel is then closed over the gasket 3 and secured against it in a conventional manner. Resin is then poured into the mould thus formed and the resin is polymerized in an accepted manner. The resin may be introduced into the mould at the free end of the gasket 3 which is thereafter closed against gasket 4.

I claim:

1. A panel adapted for use in electrostatic shielding comprising a panel of nonconductive plastic, a wire mesh of conductive material embedded within and spaced from the periphery of said plastic panel, a discontinuous gasket extending about said mesh and bonded to the periphery of said plastic panel, a tubular gasket extending between and in engaging relation with the ends of said gasket, with one end of said tubular gasket projecting out of an edge of said panel, and a flexible conductive extension connected at one end to said mesh and extending out of said panel through said tubular gasket.

2. A panel as set forth in claim 1 wherein said discontinuous gasket has a thickness substantially equal to the thickness of said panel.

References Cited in the file of this patent

UNITED STATES PATENTS

| | | |
|---|---|---|
| 1,696,411 | Peck | Dec. 25, 1928 |
| 2,328,525 | Egolf | Aug. 31, 1943 |
| 2,385,486 | Bartoe et al. | Sept. 25, 1945 |
| 2,405,987 | Arnold | Aug. 20, 1946 |
| 2,727,088 | La Wall | Dec. 13, 1955 |

FOREIGN PATENTS

| | | |
|---|---|---|
| 782,027 | Great Britain | Aug. 28, 1957 |
| 810,814 | Great Britain | Mar. 25, 1959 |